331-96

02-27-73 XR 3,718,869

SR

United States Patent [19]

Gerlach

[11] 3,718,869

[45] Feb. 27, 1973

[54] MICROWAVE OSCILLATOR WITH COAXIAL LEAKAGE OUTPUT COUPLING

[75] Inventor: Horst W. A. Gerlach, Bethesda, Md.

[73] Assignee: The United States of America as represented by the Secretary of the Army

[22] Filed: March 29, 1971

[21] Appl. No.: 128,843

[52] U.S. Cl. ......................331/96, 325/179, 331/98, 331/101, 331/107 R, 331/107 G, 333/34, 333/82 B, 333/83 R, 343/769, 343/863

[51] Int. Cl. ..............................H03b 5/18, H03b 7/14

[58] Field of Search ..........................331/96–98, 101, 331/102, 107 R, 107 G; 333/32–35, 82 B, 83 R; 343/701, 767, 769, 860, 863; 325/178, 179

[56] References Cited

UNITED STATES PATENTS

| | | | |
|---|---|---|---|
| 3,416,098 | 12/1968 | Vane | 331/97 X |
| 3,593,193 | 7/1971 | Chang et al. | 331/96 |
| 3,534,293 | 10/1970 | Harkless | 331/96 X |
| 3,418,601 | 12/1968 | Clouser et al. | 331/107 R |
| 3,562,666 | 2/1971 | Rode | 331/96 |
| 3,605,034 | 9/1971 | Rucker | 331/96 X |

*Primary Examiner*—Roy Lake
*Assistant Examiner*—Siegfried H. Grimm
*Attorney*—Harry M. Saragovitz, Edward J. Kelly, Herbert Berl and Saul Elbaum

[57] ABSTRACT

An improved coupling arrangement between a cavity resonator with associated microwave generator and the load. The cavity includes a radial line coupling in the form of a disc capacitively coupled to a planar load terminal. The disc is concave relative to the load terminal in order to effect a uniform impedance at all radial portions of the coupling and to provide the optimum impedance match.

5 Claims, 5 Drawing Figures

INVENTOR

HORST W.A. GERLACH

BY Harry M. Saragovitz
Edward J. Kelly
Herbert Berl
Saul Elbaum

ATTORNEYS

INVENTOR
HORST W.A. GERLACH
BY Harry M. Saragovitz
Edward J. Kelly
Herbert Berl
Saul Elbaum
ATTORNEYS

MICROWAVE OSCILLATOR WITH COAXIAL LEAKAGE OUTPUT COUPLING

This invention relates to microwave generators. Microwave generators are extensively used in the communication arts, radar, as well as a variety of industrial applications. Resonant cavities are usually employed to fix the frequency of operation in lieu of distinct inductive and capacitive reactances. A resonant cavity generally operates in a fundamental oscillation mode and may also be operated in its harmonic modes, all of which are determined by the geometrical configuration of the cavity. In each such resonator the energy of the electromagnetic field is extracted by some sort of coupling to the load. For example, a loop may extend into the cavity and be connected to a load such as an antenna. Another type of coupling is a capacitive probe realized by a plate in line with the load which is coupled to the inner connector of the cavity and forming a capacity in order to lead away the energy.

Usually power cavity oscillators, at higher microwave frequencies, suffer primarily from inefficient output coupling and spurious moding, resulting in a low circuit efficiency. The inductive loop or the capacitive probe coupling require a proper position in the cavity to obtain the correct impedance transformation in order to extract the generated microwave energy either from the rf magnetic field or from the rf electric field. A stray susceptance or reactance is inherently associated with a loop or a probe coupling and is an undesired component of the matching transformer function of the coupling. The loop or the capacitive probe coupling can easily lead to non-uniformities of the electromagnetic cavity field, caused by the non-uniform current density distribution on the surface of the conductors at very high frequencies. A current flow through two adjacent conductors or their surfaces gives rise to asymmetrical current density distributions on the outer layers of the conductors by virtue of the proximity effect, i.e., the current distribution becomes non-uniform in consequence of a change of the magnetic field between the conductors. The current flow of conductors in the same direction will result in a bunched current distribution pattern. The microwave generator consisting of a cavity in association with an active microwave electron device, for example, a microwave triode, sees a complex load. Thus:

$$Y_{Load} = G_{tot} \pm j\,B_{coupl.} \qquad (1)$$

where $G_{tot} = (G_{Load} + G_{ctrc})$

Any generator for stable operation (i.e., equilibrium) has to satisfy:

$$Y_{el} + Y_{Load} \equiv 0 \qquad (2)$$

where $Y_{el} = G_{el} + jB_{el}$ constitutes the electronic admittance.

This condition requires that both the real and the imaginary components have to be identically zero. Thus:

$$G_{el} + G_{tot} \equiv 0 \qquad (3a)$$

$$B_{el} + B_{coupl} \equiv 0 \qquad (3b)$$

Condition (3*b*) is satisfied at one frequency only for a given $B_{coupl}$, i.e., the oscillator may experience a frequency shift where the new frequency can differ from an optimum oscillatory condition.

If, however, the stray susceptance or reactance is avoided, this undesired effect can be eliminated. This can be achieved by introducing a proper transmission line transformer coupling between the cavity and the rf output line or load strongly reducing the stray susceptances. The new transmission line transformer arrangement considerably reduces the rf losses which are caused by a loop or probe coupling. In addition, any loop or probe coupling causes an asymmetric field, thus a localized and enhanced displacement and wall current caused by the proximity effect distribution in the cavity, giving rise to undesired spurious mode excitation. Spurious modes extract useful rf energy. The energy absorbed by the spurious modes shows up as circuit loss, thus reducing the available rf energy and cannot accordingly be utilized as effective power. It is assumed that no radial field vectors and no axial and angular field variations occur.

According to the practice of the present invention such coupling losses are materially reduced. The new coupling termed a leakage coupling represents an in-line transformer loading the cavity uniformly. This implies that the current density on the cavity walls is evenly distributed, thus permitting an undistorted electromagnetic cavity field distribution and eliminating spurious oscillation modes.

It may be shown that the circuit efficiency of a microwave generator is $$n_{ctr} = 1 - [(G_{ctrc} + G_{mode})\,(1 + B_{str}/\omega\, C_{equ})]/[G_{ctrc} + G_{mode} + G_{load}] \qquad (1)$$

This expression shows that the circuit efficiency is lowered by the presence of $G_{mode}$ and $B_{str}$. According to the practice of this invention, these terms can be eliminated. The coupling of this invention also precludes multiplicities of higher order modes of oscillation of the resonant cavity thus permitting the cavity to be designed only for operation at its fundamental mode. Conventional loop or capacitive probe couplings at higher frequencies (harmonic in the fundamental) require a certain geometrical size in order to realize the necessary degree of coupling for proper impedance matching. This requires the cavity to be lengthened by λ/2 or a multiple of it for the next higher node. Any such additional cavity lengthening necessarily increases the surface area of the cavity, in turn adding to conduction circuit losses.

Figure 1:
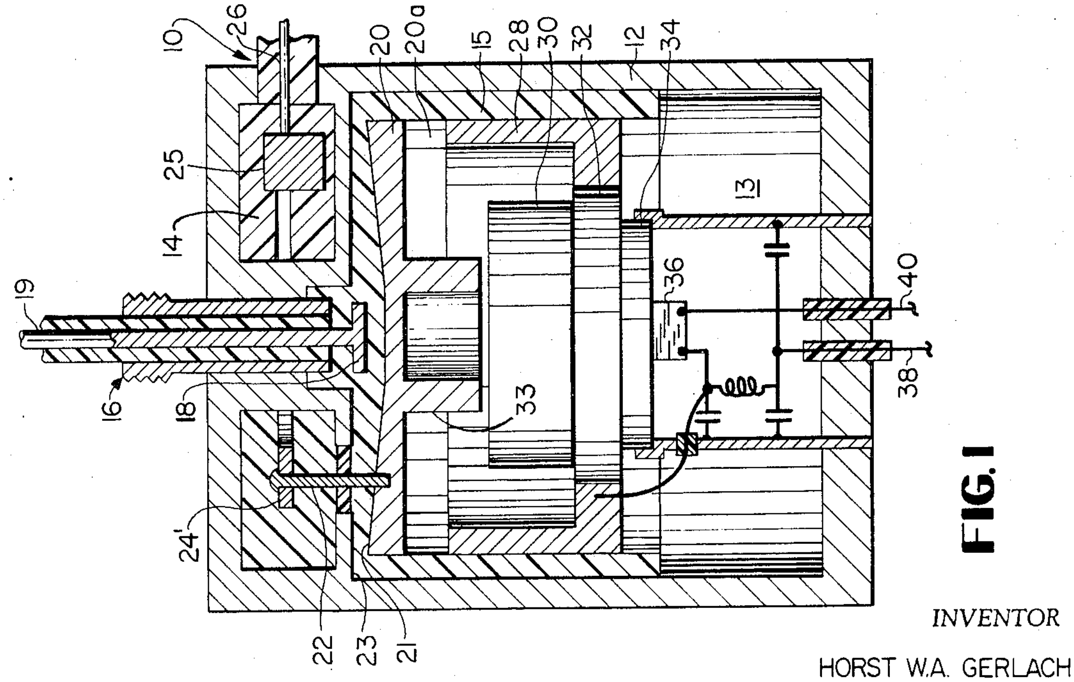
FIG. 1 is a cross-section of a microwave triode provided with the leakage output coupling of this invention.

Referring now to FIG. 1 of the drawings, the numeral 10 denotes generally a triode microwave oscillator which includes a generally cylindrical metal shell 12. Electrical insulation consisting of, for example, a low loss ceramic is denoted by the numeral 14 and a sleeve 15 formed therefrom serves to space and maintain several of the elements to be described in their indicated position. The ceramic sleeve 15 has a multiple purpose, it controls the matching and the electrical length of the transforming line formed by the sleeve 28 and the shell 12 as well as the transforming radial line formed by the plate 20 and the face 23. The characteristic impedance of the transforming line is changed by the factor $1/\sqrt{\epsilon}$ and the electrical length by the factor $\sqrt{\epsilon}$, where $\epsilon$ is the dielectric constant of ceramic sleeve 15, i.e., the geometric length of those circuit components is shortened. In addition the ceramic sleeve 15 constitutes a relatively good heat conducting medium, thus acting as a heat sink in order to lead away the heat caused by dissipation of the tube. Numeral 16 denotes a radio frequency output connector assembly provided on its innermost end with a disc conductor 18. The cable 19 of the connector 16 is coupled to a load, for example, an antenna. The numeral 20 denotes a radial line section in the form of a metal disc of increasing thickness with increasing radial dimension which functions as a part of the plate circuit of the microwave oscillator. The numeral 21 denotes the upper surface of the plate 20 and it will be observed that in the shown case the surface is concave with respect to the output probe connector 18. Numeral 22 denotes an electrical connection from the plate 20 through quarter wavelength filter element denoted by the numeral 24. The numeral 26 denotes an electrical lead extending from a source of direct current, such as the plus terminal of a battery, to an end node 25 on the ring section 24' of the filter 24. The numeral 28 denotes a feedback coupling ring, in the form of a bottom-apertured cup, providing the necessary feedback voltage from the plate circuit to the cathode circuit.

The numeral 30 denotes a microwave triode having a vacuum envelope in the general configuration of a ceramic cylinder and of known construction. The numeral 32 schematically denotes a grid terminal of the microwave triode. Similarly, the numeral 34 schematically denotes the terminal of the cathode. The numeral 36 denoted the filament terminal, leading to the heater of the cathode. Lead 40 energizes the filament and the lead 38 provides bias voltage to the grid of the triode and these leads are illustrated in association with a filter network.

A cylindrical anode 33 is integral with and extends from the bottom of plate 20. Since anode 33 is integral with plate 20 it obtains its D.C. bias through electrical connection 22 coupled to plate 20.

In general, the basic mode of operation of microwave oscillators is known and accordingly a detailed description will not be given.

The resonant cavity defined by the volume below the plate 20 and the cup 28 is coupled to the output probe 18 by means of a capacitive gap 20*a*. Coupling is attained by means of the spacing between the disc 20 and the cylinder 28. In general, the characteristic impedance of the coupling arrangement of the radial transmission line bounded by surfaces 21 and 23, seen at the center, between the probe 18 and the disc 20, varies with the radial distance from the axis of symmetry of the cavity. This axis of symmetry is coincident with the axis through the output cable 16. The impedance of the radial transmission line is directly proportional to the electric field (itself a function of the radial distance for a varying spacing confined by 21 and 23) and is inversely proportional to the magnetic field. This is shown by the following relation (see "Fields and Waves" in "Communication Electronics" by Ramo et al, Wiley, 1965) in $$Z_o(r) \alpha [E_z(r)/H \theta (r)]$$

By theoretical reasoning, it can be shown that the radial transmission line, utilized as an impedance transformer, can cover a very wide range or impedance transformation ratios assuming a constant power flow and is governed by the configuration of the radial line. For the concave shape of the plate 20, as shown in FIG. 1, i.e., if $d_2<d_1$, $Z_o(r)$ decreases as $r$ increases, resulting in a large transformation ratio. $d_2$ denotes the spacing at the outer radius $r_2$ and $d_1$ is the spacing at the inner radius $r_1$, respectively, of the plate 20. For a convex shape of the plate 20 the situation is reversed, i.e., for $d_2>d_1$, the radial line impedance $Z_o(r)$ will increase as $r$ increases. If a proper $d_2/d_1$ ratio is chosen, the radial line impedance remains constant as $r$ is varied. For the case where $d_2 = d_1$, (equidistant spacing of 20 and 23 from $r_1$ to $r_2$) an intermediate transformation ratio is obtained.

Devices made in accordance with the practice of this invention show that the coupling cavity arrangement proved to be free of spurious oscillation modes. Further, the circuit efficiency exhibited considerable improvement (higher than 85 percent) over similar cavities equipped with loop or assymmetric probe coupling at the same resonant frequencies and of the same general configuration. The cost of manufacture was significantly lower as compared to equivalent loop or probe coupled cavity oscillators.

Figure 3:
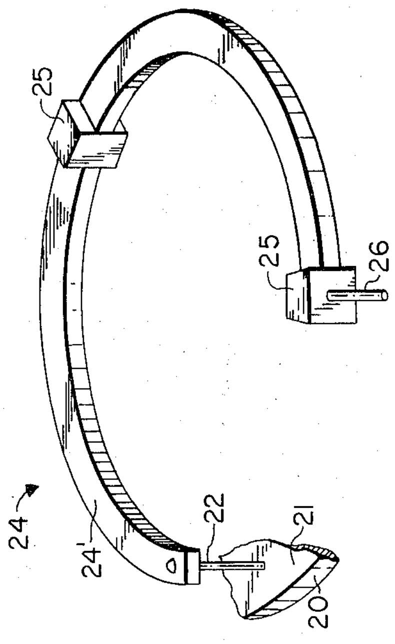
FIG. 3 is a view of the one-quarter wavelength filter arrangement for applying $B_+$ to the microwave triode of FIG. 1.

Referring now to FIG. 3 of the drawings, a detail of a one-quarter wavelength filter network is illustrated. The lead 22 extends upwardly from the surface 21 and into a flattened conductor section 24'. At approximately one-quarter of a wavelength (of the fundamental frequency) node plates 25 are inserted into the section. These node plates represent a capacitive load at these points thus resulting in "high reflecting" elements and reject the rf wave and prevent rf radiation from passing to the $B_+$ terminal. In the example illustrated, two such node plates are provided. The direct current resistance from the plate 20 to coupling lead 22, through the one-quarter wavelength filter and thence to terminal 26 and the direct current bias is negligible, however, a very high impedance along this path is offered by means of the indicated filter to the high frequency oscillations. This system serves to isolate the electromagnetic potentials from the external direct current bias potentials. Block ac filters may also be provided for the ground lead (not illustrated) coupled to the cathode.

Figure 2:
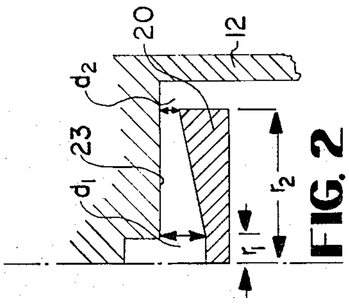
FIG. 2 is a view taken from FIG. 1, and showing certain dimensions.

Typical dimensions of an oscillator such as shown at FIGS. 1 and 2 of the drawings, operating at 3GHz and higher in association with the microwave triode are as follows. The diameter of the plate 20 was 0.8 inch; the diameter of the lower piece integral with the plate was 0.325 inch. The inner diameter of the cylinder 12 was 0.98 inch. The spacing between the uppermost portion of the plate 20 and the nearest upper part 23 of the shell 12 was 0.06 inch.

Figure 4:
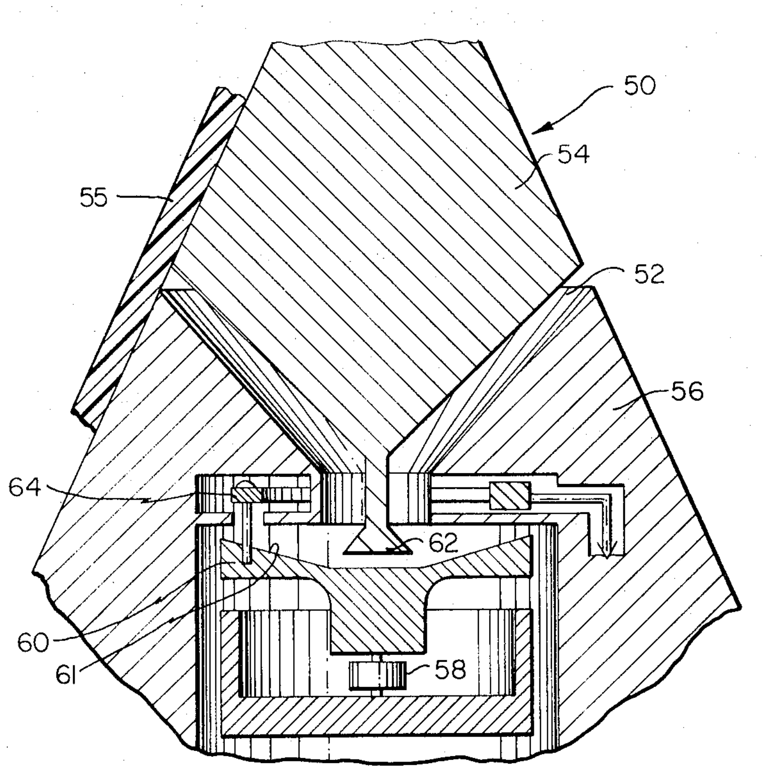
FIG. 4 is a cross-section similar to FIG. 1 illustrating the invention in association with a slot antenna.

Referring now to FIG. 4 of the drawings, an embodiment of the invention is illustrated as applied to a radiating slot antenna, e.g., for airborne application. The numeral 50 denotes a cone shaped member provided with a continuous annular slot 52. The forward portion 54 and rear portion 56 are connected to one another as by metal strips at the nodes of the radiating rf waves or are held together by means of dielectric material 55 (partially illustrated) secured to both members. Numeral 58 denotes a microwave oscillator source positioned within the resonator. The plate 60 corresponds to the plate 20 of the embodiment of FIG. 1. The metal plate 60 is provided with an upper surface 61 which is concave with respect to an output probe 62. The numeral 64 denotes a one-quarter wavelength filter arrangement as described earlier in FIG. 3, which serves to define a high ac impedance to the oscillations within the cavity but which provides a source of low resistance to the indicated direct current bias for the oscillator 58. This is entirely similar to the filter shown in FIG. 3.

Figure 5:
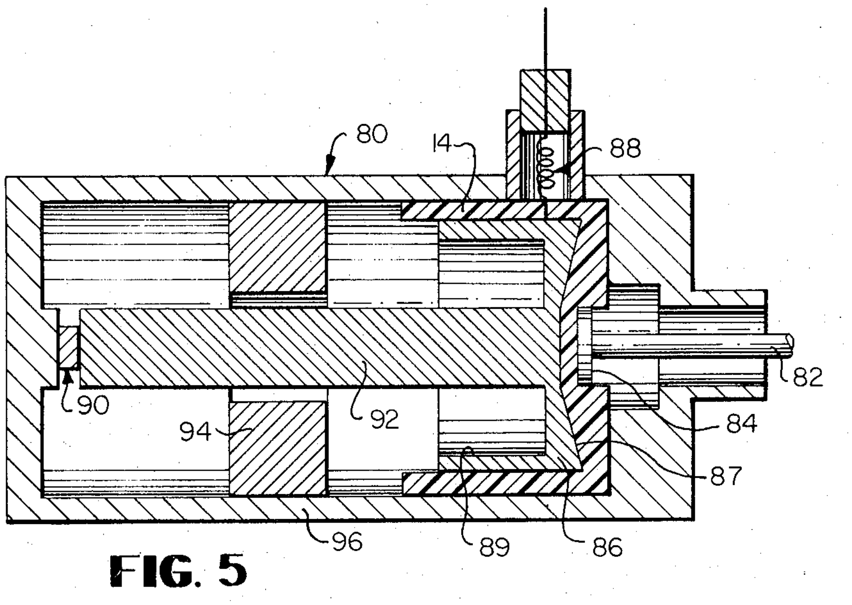
FIG. 5 is a cross-section, similar to FIG. 1, illustrating the invention as applied to another cavity, powered by a negative resistance solid state oscillator.

Referring now to FIG. 5 of the drawings, another embodiment of the invention is illustrated and shows how the new coupling concept of this invention may be adapted to another kind of resonator system. The numeral 80 denotes in general a microwave generator defined by a metallic shell or cylindrical housing. Numeral 82 denotes a radio frequency output cable coupled to the load, which may be an antenna. The numeral 84 denotes an output probe coupled to the coaxial element 82 and in capacitive relationship with a disc plate metal member 86 having an upper concave surface 87. The plate 86 may be provided with an internal depending skirt element 89 as a reentrant cavity, a tap being made from the skirt element and provided with a high impedance one-quarter wavelength filter 88 and thence to a source of direct current bias. Numeral 90 denotes a negative resistance oscillator which may assume a form of a solid state diode, such as a Gunn diode or avalanche diode. The oscillator 90 is positioned along the axis of symmetry of the device, in contact with another integral extension 92 of the plate 86. The numeral 94 denotes an annulus which is slidable along the axis of the device to vary the frequency of the output.

I claim:

1. A microwave generator including a. an active element for generating high frequency oscillations, b. a resonant cavity housing said active element and electromagnetically coupled thereto, c. an output coupling including a plate disposed within and spaced from one end of said resonant cavity and capacitively coupled to a rf output probe, said probe being spaced equidistant with respect to said plate, d. the space between said plate and said one end of said resonant cavity defining a radial transmission line means for capacitively coupling said resonant cavity to said output probe, said radial transmission line means being of such a shape that the characteristic impedance of said radial transmission line is substantially constant in a radial direction to facilitate optimum impedance matching between said resonant cavity and the rf output.

2. The generator of claim 1 including a. a high ac impedance filter electrically connected between said plate and an external source of dc bias potential, whereby the ac and dc potentials on the plate are isolated.

3. The generator of claim 1 including an insulating medium between said one end of said cavity and said output plate.

4. The generator of claim 1 wherein said output coupling is connected to a cone-shaped antenna having a continuous annular slot therein.

5. The generator of claim 1 wherein said surface of said plate facing said one cavity end is concave.

* * * * *